(12) United States Patent
Hayashi et al.

(10) Patent No.: US 11,414,029 B2
(45) Date of Patent: Aug. 16, 2022

(54) WIRE HARNESS FOR RETAINING A COVER THERE OF

(71) Applicant: SUMITOMO WIRING SYSTEMS, LTD., Yokkaichi (JP)

(72) Inventors: Masashi Hayashi, Yokkaichi (JP); Ryo Kuroishi, Yokkaichi (JP); Hirokazu Nakai, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 573 days.

(21) Appl. No.: 16/480,817

(22) PCT Filed: Jan. 16, 2018

(86) PCT No.: PCT/JP2018/001037
§ 371 (c)(1),
(2) Date: Jul. 25, 2019

(87) PCT Pub. No.: WO2018/139271
PCT Pub. Date: Aug. 2, 2018

(65) Prior Publication Data
US 2019/0389402 A1   Dec. 26, 2019

(30) Foreign Application Priority Data
Jan. 26, 2017   (JP) .............................. JP2017-012154

(51) Int. Cl.
*H01R 13/56* (2006.01)
*B60R 16/02* (2006.01)
(Continued)

(52) U.S. Cl.
CPC ......... *B60R 16/0215* (2013.01); *H01R 13/56* (2013.01); *H02G 3/0481* (2013.01); *H02G 3/0616* (2013.01)

(58) Field of Classification Search
CPC .. B60R 16/0215; H01R 13/56; H02G 3/0481; H02G 3/0616
(Continued)

(56) References Cited

U.S. PATENT DOCUMENTS 9,566,919 B2 *   2/2017   Kushima .............. H05K 9/0098
2015/0101842 A1   4/2015   Han et al.
(Continued)

FOREIGN PATENT DOCUMENTS

JP   2011-259568 A   12/2011
JP   2013-241143 A   12/2013
(Continued)

OTHER PUBLICATIONS

Feb. 13, 2018 International Search Report issued in International Patent Application No. PCT/JP2018/001037.

*Primary Examiner* — Timothy J Thompson
*Assistant Examiner* — Michael F McAllister
(74) *Attorney, Agent, or Firm* — Oliff PLC

(57) ABSTRACT

A wire harness that includes a cylindrical connector shell; a cylindrical flexible conductor; a fixing member for fixing the flexible conductor to an end of the connector shell; and a cover that covers the connector shell and the flexible conductor, wherein: the cover is fixed through fastening to the connector shell by a fixing band that is arranged on an outer circumferential surface of a leading end of the cover, and the cover includes: a connector fastener that is fastened to the connector shell by the fixing band; a covering that covers the fixing member; and a rib that protrudes inward between the connector fastener and the covering.

1 Claim, 2 Drawing Sheets

(51) Int. Cl.
*H02G 3/04* (2006.01)
*H02G 3/06* (2006.01)

(58) Field of Classification Search
USPC .......................................................... 285/226
See application file for complete search history.

(56) References Cited

U.S. PATENT DOCUMENTS

2015/0318679 A1* 11/2015 Nakai ....................... H02G 3/22
  16/2.2
2016/0134090 A1* 5/2016 Kushima .............. H05K 9/0098
  174/362

FOREIGN PATENT DOCUMENTS

| | | |
|---|---|---|
| JP | 2014-116997 A | 6/2014 |
| JP | 2016-092250 A | 5/2016 |

* cited by examiner

WIRE HARNESS FOR RETAINING A COVER THERE OF

This application is the U.S. National Phase of PCT/JP2018/001037 filed Jan. 16, 2018, which claims priority to JP 2017-012154 filed Jan. 26, 2017, the entire disclosure of which is incorporated herein by reference.

BACKGROUND

The present disclosure relates to a wire harness.

Conventionally, a vehicle such as an electric automobile or a hybrid car includes a wire harness for electrically connecting a battery and an inverter, for example. The wire harness is routed under the floor of the vehicle or the like, for example. The wire harness includes multiple wires and a pipe for covering the multiple wires. A waterproof cover is mounted on an end portion of the pipe (e.g., see JP 2013-241143A).

SUMMARY

In view of this, if the above-described waterproof cover is pulled by a high load, there is a risk that the waterproof cover will come off.

An exemplary aspect of the disclosure provides a wire harness that enables retaining of the cover member.

A wire harness according an exemplary aspect of the disclosure includes: a cylindrical connector shell; a cylindrical flexible conductor; a fixing member for fixing the flexible conductor to an end of the connector shell; and a cover that covers the connector shell and the flexible conductor, wherein: the cover is fixed through fastening to the connector shell by a fixing band that is arranged on an outer circumferential surface of a leading end of the cover, and the cover includes: a connector fastener that is fastened to the connector shell by the fixing band; a covering that covers the fixing member; and a rib that protrudes inward between the connector fastener and the covering, According to this configuration, when the cover is pulled by a high load, the rib of the cover comes into contact with the fixing member for fixing the flexible conductor through fastening. Due to the rib coming into contact, the movement of the cover is restricted and the cover is retained.

With the above-described wire harness, it is preferable that the connector shell includes: a cover attachment to which the cover is fixed through fastening; and a conductor attachment to which the flexible conductor is fixed through fastening, the connector shell has a stepped shape due to an outer dimension of the conductor attachment being smaller than an outer dimension of the cover attachment, and thus has a restriction surface that is located on an end of the cover attachment, and the rib is formed so as to protrude inward with respect to an outer surface of the cover attachment.

According to this configuration, when the cover is mounted on the connector shell, the rib of the cover comes into contact with the restriction surface of the connector shell. Accordingly, the cover is positioned with respect to the connector shell.

According to the wire harness of the present disclosure, the cover can be retained.

DETAILED DESCRIPTION OF EMBODIMENTS

Figure 1:
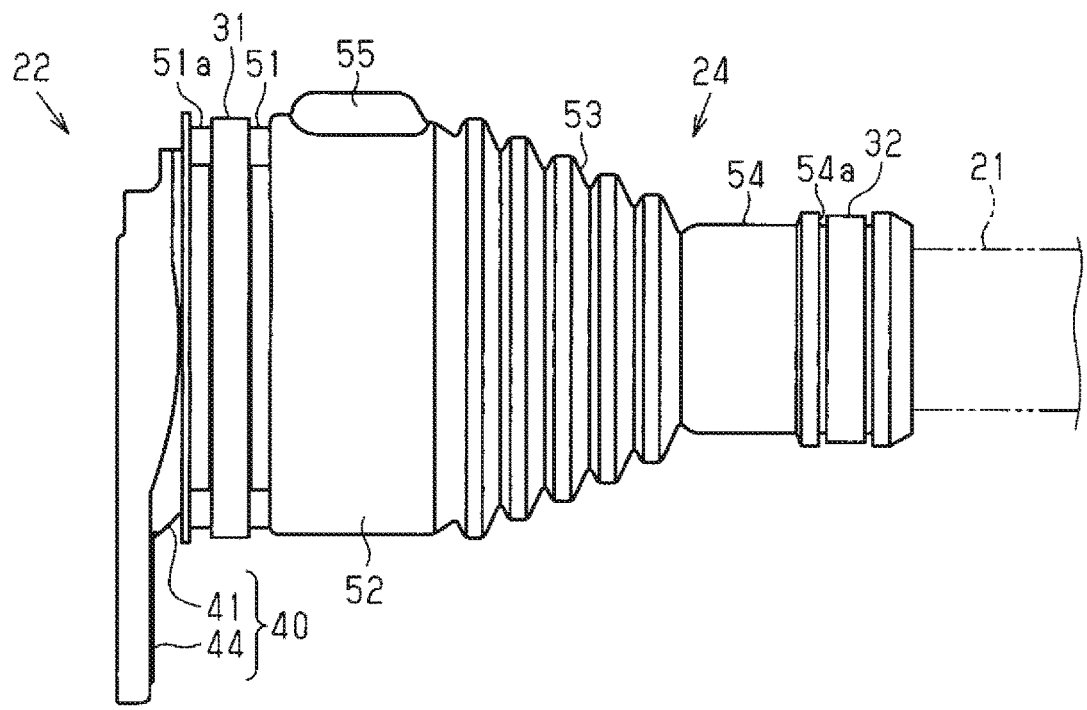
FIG. 1 is a partial side view of a wire harness.

Hereinafter, embodiments will be described.

Note that in the accompanying drawings, constituent elements are shown enlarged in some cases in order to facilitate comprehension. The dimensional proportions of the constituent elements differ from the actual dimensional proportions or from other dimensional proportions in the drawings in some cases. Also, in cross-sectional drawings, hatching of some constituent elements is omitted in some cases in order to facilitate comprehension.

Figure 4:
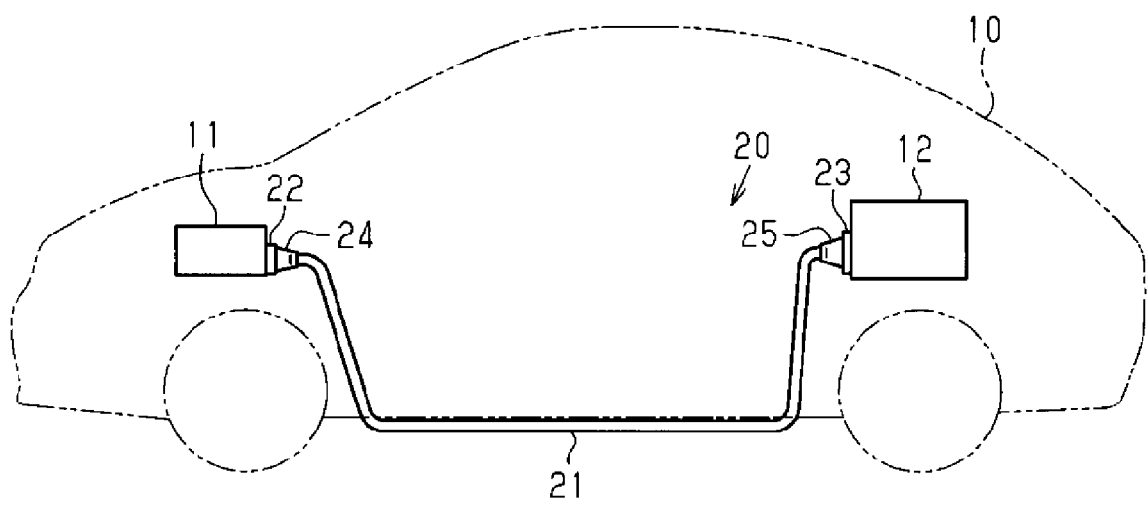
FIG. 4 is a schematic view showing an example of a routing state of the wire harness.

A vehicle 10 shown in FIG. 4 is a hybrid car, an electric automobile, or the like, for example. The vehicle 10 includes: an inverter 11; a high-voltage battery 12; an inverter 11; and a wire harness 20 for electrically connecting the inverter 11 and the high-voltage battery 12. The inverter 11 is mounted in the front portion of the vehicle 10, and the high-voltage battery 12 is mounted in the rear portion of the vehicle 10. The wire harness 20 is routed so as to pass under the floor of the vehicle 10.

The wire harness 20 includes: a protective tube 21; connectors 22 and 23; and cover members 24 and 25 (covers). A wire (not shown) for electrically connecting the inverter 11 and the high-voltage battery 12 is inserted through the protective tube 21. The protective tube 21 protects the wire from water, flying stones, and the like. For example, a metal pipe of aluminum or the like, a corrugated tube that is composed of resin or the like and is flexible, or the like, or a combination thereof can be used as the protective tube 21. If a corrugated tube is used, a cylindrical flexible conductor is contained in the interior so as to cover the wire.

The connector 22 is connected to the inverter 11, and the connector 23 is connected to the high-voltage battery 12.

The cover members 24 and 25 are formed into cylindrical shapes overall. The cover members 24 and 25 are attached so as to bridge between the connectors 22 and 23 and the protective tube 21.

As shown in FIG. 1, the cover member 24 is fixed through fastening by a fastening band 31 (fixing band) so as to be in close contact with the outer surface of the connector 22. Also, the cover member 24 is fixed through fastening by a fastening band 32 so as to be in close contact with the outside of the end portion (end) of the protective tube 21.

Figure 3:
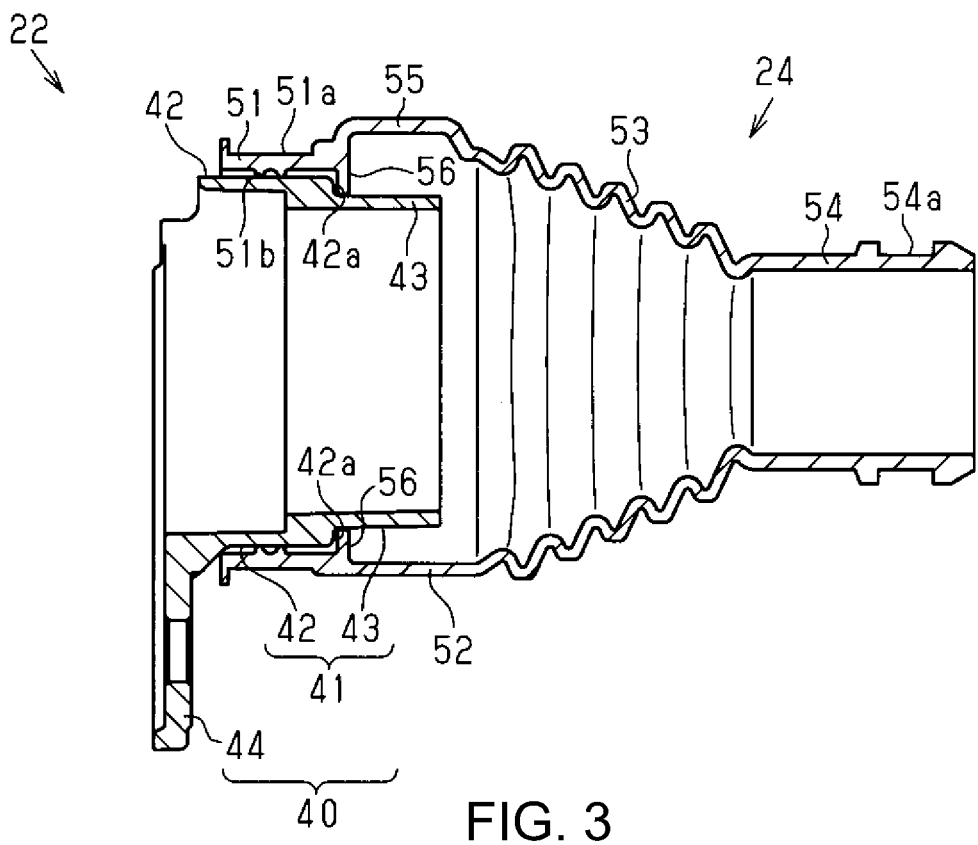
FIG. 3 is a cross-sectional view of the cover member and the connector shell.

As shown in FIG. 3, the connector 22 includes: a connector shell 40; and a connector housing covered by the connector shell 40, and the connector housing contains a terminal connected to a wire (these elements are not shown in the drawings). A conductive metal (e.g., aluminum or iron) can be used as the material of the connector shell 40.

As shown in FIG. 3, the connector shell 40 includes: a cylindrical connection portion 41; and a fixing portion 44 that is provided so as to extend outward in a plate shape from the connection portion 41. A fixing bolt is inserted through the fixing portion 44, and the connector 22 is fixed to an in-vehicle device, that is, the inverter 11 shown in FIG. 4, by the fixing bolt.

The connection portion 41 is formed such that its outer dimension decreases in a step-wise manner toward the protective tube 21, and includes: a cover attachment portion 42 (cover attachment); and a conductor attachment portion 43 (conductor attachment).

In the connection portion 41, the cover attachment portion 42 is arranged on the device side (left side in FIG. 3) to which the connector shell 40 is attached. The conductor attachment portion 43 is arranged on the protective tube 21 side (right side in FIG. 3) shown in FIG. 1, with respect to the cover attachment portion 42. The cover attachment portion 42 and the conductor attachment portion 43 are formed such that the connector shell 40 has a stepped shape. To give a detailed description, the outer dimension of the conductor attachment portion 43 is set to be smaller than the outer dimension of the cover attachment portion 42. Also, the connector shell 40 includes a restriction surface 42a on an end portion of the cover attachment portion 42 due to the cover attachment portion 42 and the conductor attachment portion 43, which are formed in this manner. That is, in the outer circumference of the connection portion 41 of the connector shell 40, there is a level difference located between the cover attachment portion 42 and the conductor attachment portion 43, and the restriction surface 42a is formed by this level difference.

As shown in FIG. 1, the cover member 24 includes, in order from the connector 22 (connector shell 40) side to the protective tube 21: a connector fastening portion (connector fastener) (seal lip portion) 51; a covering portion 52 (covering); a bellows portion 53; and a protective tube fastening portion 54.

As shown in FIG. 3, the connector fastening portion 51 is formed in a cylindrical shape that covers the cover attachment portion 42 of the connector shell 40. Multiple (e.g., two) sealing lips 51b that protrude inward are formed on the inner circumferential surface of the connector fastening portion 51. The sealing lips 51b are formed continuously over the entire circumference of the connector fastening portion 51.

An attachment groove 51a is provided recessed over the entire circumference of the outer circumferential surface of the connector fastening portion 51. As shown in FIG. 1, a fastening band 31 is attached to the attachment groove 51a. A known fastening band can be used as the fastening band 31. As an example, the fastening band 31 includes: a band-shaped portion; and a lock portion that is formed integrally with the band-shaped portion on one end of the band-shaped portion. By causing a locking hook inside of the lock portion to engage with one of multiple locking edges formed on the band-shaped portion, the connector fastening portion 51 is fixed through fastening to the cover attachment portion 42. The sealing lips 51b each come into close contact with the outer circumferential surface of the cover attachment portion 42 and seal the gap between the cover member 24 and the connector shell 40.

The covering portion 52 is formed so as to cover the conductor attachment portion 43 at a predetermined distance from the outer circumferential surface of the conductor attachment portion 43. For example, the covering portion 52 has an outer dimension that is slightly larger than the outer dimension of the connector fastening portion 51. The covering portion 52 protrudes outward in the radial direction and forms a containing portion 55. That is, the covering portion 52 defines the containing portion 55 with the conductor attachment portion 43.

A rib 56 that protrudes inward is provided on the inner circumferential surface of the end portion on the connector fastening portion 51 side of the covering portion 52. For example, the rib 56 is formed continuously over the entire circumference of the covering portion 52. The rib 56 is formed so as to protrude inward with respect to the inner surface of the connector fastening portion 51.

The bellows portion 53 is formed such that its outer dimension gradually decreases in size the further from the covering portion 52 it is.

The protective tube fastening portion 54 is formed into a cylindrical shape that covers the protective tube 21 (see FIG. 1). The attachment groove 54a is provided recessed over the entire circumference on the outer circumferential surface of the protective tube fastening portion 54. As shown in FIG. 1, a fastening band 32 is attached to the attachment groove 54a. A known fastening band can be used as the fastening band 32, similarly to the above-described fastening band 31. The protective tube fastening portion 54 is fixed through fastening to the protective tube 21 by the fastening band 32.

Figure 2:
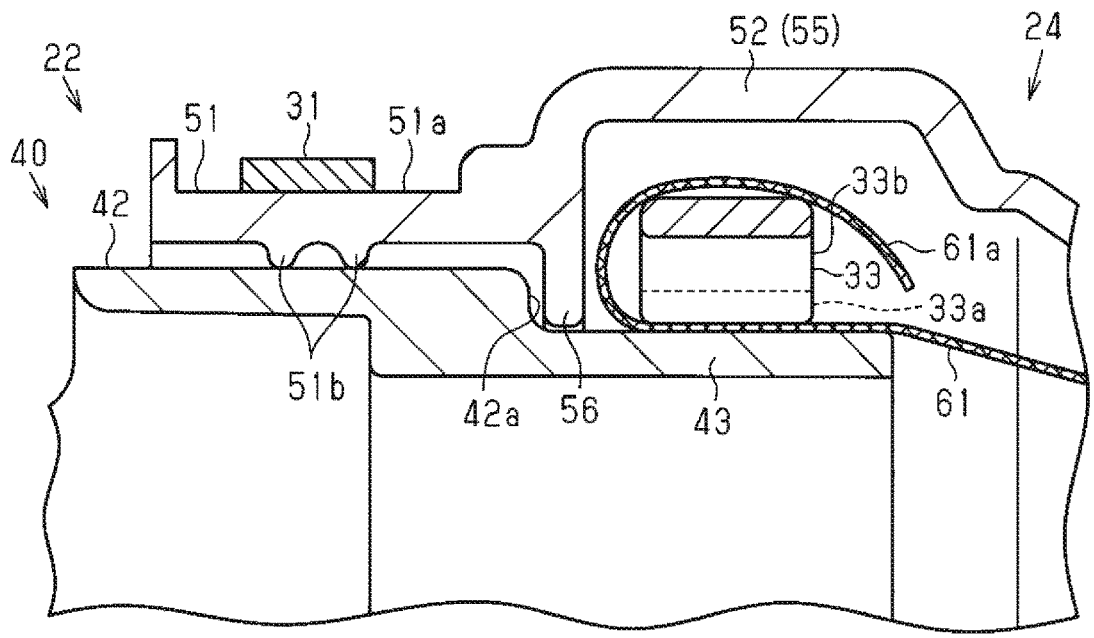
FIG. 2 is a partial enlarged cross-sectional view of a cover member and a connector shell.

As shown in FIG. 2, the flexible conductor 61 is connected to the conductor attachment portion 43. For example, the flexible conductor 61 is a braided member formed by braiding copper-based metal strands with surfaces subjected to tin plating, into a mesh shape and an elongated cylinder shape. Note that a metal sheet (metal foil), a metal fabric, or the like that has been made into a cylindrical shape can be used as the flexible conductor 61. A wire (not shown) is inserted through the flexible conductor 61. The flexible conductor 61 is attached over the conductor attachment portion 43 and is fixed by the fixing member 33. For example, the fixing member 33 includes: a ring-shaped main body portion 33a with a diameter that can be reduced; and a fixing portion 33b for maintaining the reduced-diameter state of the main body portion 33a. The containing portion 55 of the cover member 24 is formed with the covering portion 52 bulging outward in order to contain the fixing portion 33b.

For example, a known crimping ring can be used as the fixing member 33. A crimping ring having a crimping portion can be used as the crimping ring, for example. The crimping ring is formed such that, in a natural state, a portion of the ring-shaped main body portion protrudes outward in the radial direction as the crimping portion in a roundabout way. When the crimping ring is fastened, the main body portion can be transitioned to the reduced-diameter state by pinching the base portion of the crimping portion to bring it nearer, and thus the flexible conductor 61 is fixed to the conductor attachment portion 43 of the connector shell 40. Note that a crimping ring not having a crimping portion can also be used as the crimping ring.

The end portion 61a of the flexible conductor 61 is folded over so as to cover the fixing member 33. The end portion 61a of the flexible conductor 61 is tape-wound. Through tape-winding, the flexible member 61 is prevented from coming off and the like.

The cover member 24 includes a rib 56 that protrudes inward between the connector fastening portion 51 that is fastened by the fastening band 31 and the covering portion 52 that covers the fixing member 33. For this reason, when the cover member 24 is pulled by a high load, the rib 56 of the cover member 24 comes into contact with the fixing member 33 that fixes the flexible conductor 61 through fastening. Due to coming into contact with the rib 56, the movement of the cover member 24 is restricted and the cover member 24 is retained.

The connector shell 40 is formed into a stepped shape by the cover attachment portion 42 and the conductor attachment portion 43, and the restriction surface 42a is included on the end portion of the cover attachment portion 42. Also, the rib 56 is formed so as to protrude inward with respect to the outer surface of the cover attachment portion 42. For this reason, when the cover member 24 is attached to the connector shell 40, the rib 56 of the cover member 24 comes into contact with the restriction surface 42a of the connector shell 40. Accordingly, the cover member 24 is positioned with respect to the connector shell 40.

For example, if the restriction surface with which the end portion of the cover member comes into contact is formed on the connector shell in order to position the cover member, the connector shell will increase in size (the length of the connector shell will increase). In contrast to this, in the present embodiment, the rib 56 formed between the connector fastening portion 51 fastened by the fastening band 31 and the covering portion 52 for covering the fixing member 33 comes into contact with the restriction surface 42a, and thus there is no need for a portion that comes into contact with the leading end of the cover member 24. Therefore, the connector shell can be made smaller in size (the length of the connector shell can be reduced).

As described above, according to the present embodiment, the following effects are demonstrated.

(1) The wire harness 20 includes: the connector 22; and the cover member 24 for covering the connector 22. The cover member 24 is fixed through fastening to the connector shell 40 of the connector 22. A flexible conductor 61 is fixed by a fixing member 33 to the conductor attachment portion 43 of the connector shell 40. In order starting from the leading end, the cover member 24 includes: the connector fastening portion 51 that is fixed through fastening to the cover attachment portion 42 of the connector shell 40 by the fastening band 31; and the covering portion 52 that covers the fixing member 33. Also, the cover member 24 includes the rib 56 that protrudes inward between the connector fastening portion 51 and the covering portion 52.

When the cover member 24 is pulled by a high load, the rib 56 of the cover member 24 comes into contact with the fixing member 33 that fixes the flexible conductor 61 through fastening. Due to the rib 56 coming into contact therewith, the movement of the cover member 24 is restricted, and therefore the cover member 24 can be retained.

(2) The connector shell 40 is formed in a stepped shape by the cover attachment portion 42 and the conductor attachment portion 43, and includes the restriction surface 42a on the end portion of the cover attachment portion 42. Also, the rib 56 is formed so as to protrude inward with respect to the outer surface of the cover attachment portion 42. For this reason, when the cover member 24 is attached to the connector shell 40, the rib 56 of the cover member 24 comes into contact with the restriction surface 42a of the connector shell 40. Accordingly, the cover member 24 is positioned with respect to the connector shell 40. For this reason, compared to a configuration in which positioning is performed using the leading end of the cover member 24, there is no need for a member for forming the restriction surface, and thus the size of the connector shell 40 can be reduced (the length of the cylindrical connection portion 41 can be reduced).

Note that the above-described embodiments may also be implemented in the following modes.

The cover member 24 of the above-described embodiment had the bellows portion 53, but it is also possible to use a cover member having a portion whose external shape becomes smaller from the covering portion 52 to the protective tube fastening portion 54, instead of the bellows portion 53.

The shape of the connector shell 40 of the above-described embodiment may also be changed as appropriate. For example, it is also possible to use a shape that does not include the restriction surface 42a.

It will be appreciated by a person skilled in the art that the present disclosure may also be realized in another specific mode that does not depart from the technical idea. For example, some of the components described in the embodiments (or one or more aspects) may be omitted, or several components may be combined.

The invention claimed is:

1. A wire harness comprising:
   a cylindrical connector shell;
   a cylindrical flexible conductor;
   a fixing member for fixing the flexible conductor to an end of the connector shell; and
   a cover that covers the connector shell and the flexible conductor, wherein:
   the cover is fixed through fastening to the connector shell by a fixing band that is arranged on an outer circumferential surface of a leading end of the cover, and
   the cover includes: a connector fastener that is fastened to the connector shell by the fixing band; a covering that covers the fixing member; and a rib that protrudes inward between the connector fastener and the covering,
   the connector shell includes:
      a cover attachment to which the cover is fixed through fastening; and
      a conductor attachment to which the flexible conductor is fixed through fastening,
   the connector shell has a stepped shape due to an outer dimension of the conductor attachment being smaller than an outer dimension of the cover attachment, and thus has a restriction surface that is located on an end of the cover attachment, and
   the rib is formed so as to protrude inward with respect to an outer surface of the cover attachment.

* * * * *